May 28, 1963  J. GERMAIN  3,091,736
RADIO COMMUNICATIONS EQUIPMENT WITH SECTIONALIZED
CHASSIS AND HEAT SINKS
Filed Feb. 27, 1961  2 Sheets-Sheet 1

INVENTOR.
Jack Germain
BY Mueller & Aichele
Attys.

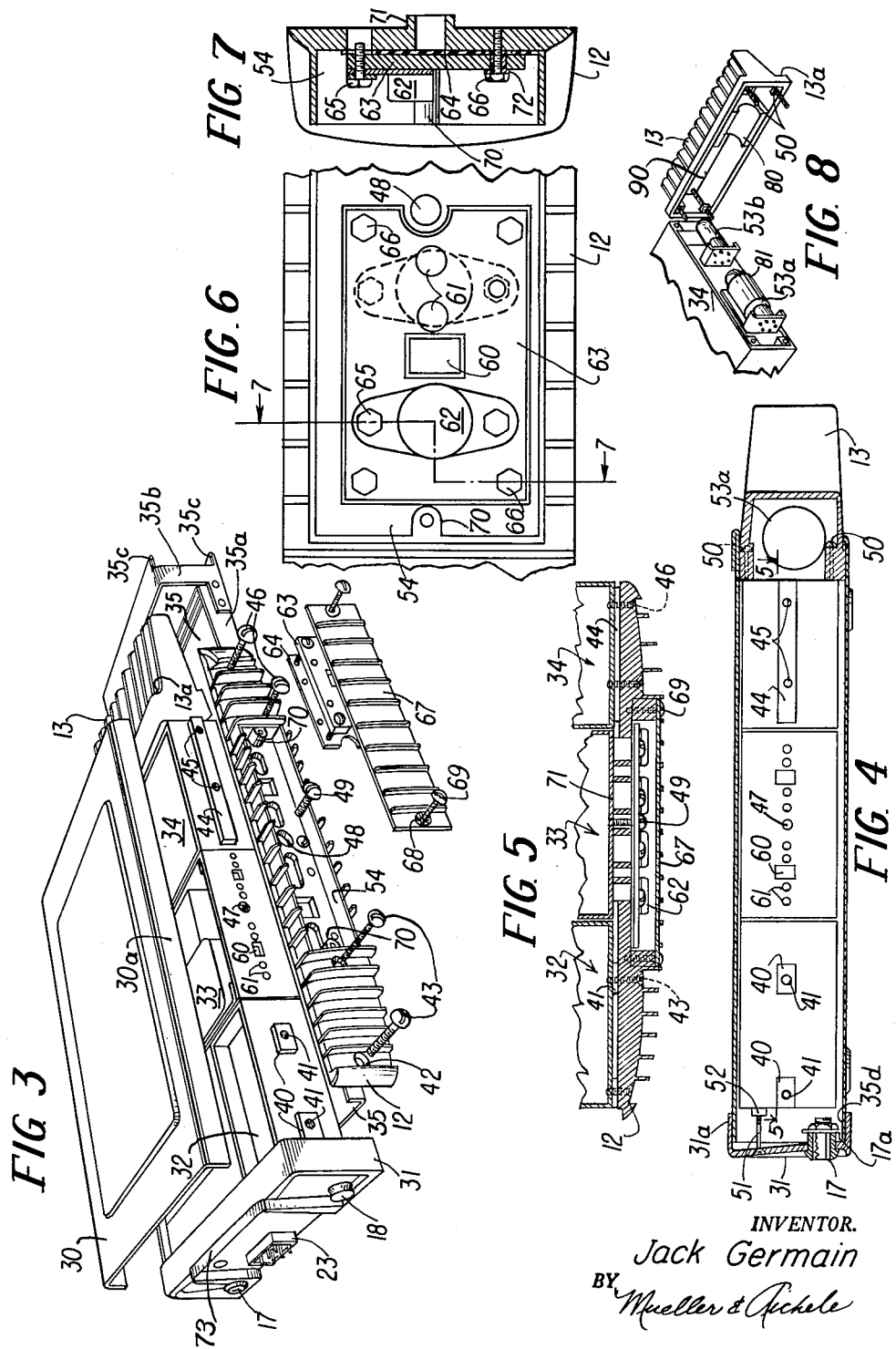

United States Patent Office 3,091,736
Patented May 28, 1963

3,091,736
RADIO COMMUNICATIONS EQUIPMENT WITH SECTIONALIZED CHASSIS AND HEAT SINKS
Jack Germain, Chicago, Ill., assignor to Motorola, Inc., Chicago, Ill., a corporation of Illinois
Filed Feb. 27, 1961, Ser. No. 91,741
8 Claims. (Cl. 325—355)

This invention relates in general to communications equipment, and in particular to two-way radio communications units which are of compact form for installation in vehicles and provides effective heat dissipation from the unit so that components therein operate at low temperature.

Two-way communication systems enjoy wide usage providing communications between operators at fixed locations and those in moving vehicles, as well as between operators in vehicles. It has become an indispensable tool in police communications and other governmental operations, as well as in commercial and industrial applications. Literally thousands of such systems are in use today in a wide variety of applications in all parts of the country, e.g., taxicabs, common carrier systems, fuel service, railroads, material handling service, and many others. In short, such systems are used in almost any business or organization, from the smallest to the largest, public or private.

Because of the installation of the equipment in vehicles, it is most desirable that the equipment be provided in compact form to minimize interference with other equipment therein, as well as with the normal operation of the vehicle. Further, the equipment should be designed for a wide variety of installations to fit the physical configuration of the vehicle and/or to satisfy user preference. In some cases it may be convenient to mount the entire radio apparatus including the operating controls under the dash of the vehicle. In other cases, it may be advantageous to locate the radio apparatus proper in the trunk of the vehicle, with the necessary operating controls located on or under the dashboard of the vehicle within convenient reach of the operator.

In providing a compact unit suitable for multiapplications, the problem is encountered in properly dissipating the heat generated by the high power components to maintain the required operating temperature range for the transistor elements. The problem is further complicated by the requirement that the radio chassis unit must be accessible for preventative or corrective servicing without the necessity of dismantling the entire radio assembly.

It is therefore an object of the present invention to provide an improved, compact, two-way radio communication unit for installation and use in vehicles.

Another object of the invention is to provide mobile communication apparatus in which the various parts are provided as integral units easily removable for servicing and positioned to provide effective heat dissipation therefrom.

A further object of the invention is to provide a new and improved assembly of mechanically interconnected individual parts which make up a single operating communications unit.

A feature of the invention is the provision of a compact two-way communications radio unit including receiver, transmitter, and power supply chassis sections, with separate heat radiator elements externally located for cooling the heat generating elements therein.

Another feature of the invention is the provision of a compact, two-way radio communications unit including receiver, transmitter and power supply sections, with external heat radiating members for dissipating the internally generated heat. One such heat radiator is located at the rear of the radio apparatus and houses the transmitter power amplifying tubes, and two additional heat radiators are located at opposing sides of the radio apparatus for dissipating heat generated by the power transistors mounted on the heat radiator elements themselves.

A further feature of the invention is the provision of a two-way radio communications unit including a plurality of sections which are mechanically interconnected as an integral operating chassis unit by heat radiating members positioned on opposing sides of the chassis unit, and with a housing for the chassis unit which includes a mounting base plate and a top cover plate cooperating with the lateral heat radiating members to completely enclose the chassis unit.

Still another feature of the invention is the provision of a heat radiating member having a recessed cavity for housing the transmitter driver and power amplifier tubes wherein a formed block of heat absorption material is included for direct heat conduction engagement with a metallic cover or casing incorporated on the power amplifier tube whereby dissipation of heat therefrom is substantially improved. The power amplifier tube is mounted on a resilient spring-loaded socket base which insures positive contact between the aforementioned metallic casing and formed block at all times regardless of variations in the component mechanical configurations.

The invention is illustrated in the following drawings where:

FIG. 3 is an exploded view of the radio apparatus showing the relationship of the component parts thereof;

FIG. 4 is a side cross section view through the assembled unit;

FIG. 5 is a top cross sectional view along the lines 5—5 of FIG. 4;

FIG. 6 is a fragmentary cross section view showing the transistors mounted to the side heat radiating member;

FIG. 7 is a fragmentary cross section view along the lines 7—7 of FIG. 6;

FIG. 8 shows the transmitter power amplifying tubes and the associated heat radiating member therefor.

In practicing the invention there is provided a two-way radio communications unit which includes a receiver, a transmitter, and a power supply, electrically and mechanically interconnected as a single operating chassis unit, and a control head for operating the radio apparatus. The receiver is of the completely transistorized type operating from the storage battery of the vehicle in which it is installed. The power supply provides the various voltages required for operation of the transmitter. The receiver is provided at the front end of the chassis, the transmitter at the rear end, and the power supply interposed between. The power amplifying tubes of the transmitter are housed within a heat radiating member affixed to the rear of the unit. For radio units having moderate RF power outputs, the heat from the power amplifying tubes may be radiated to the transmitter heat radiating member and removed therefrom by subsequent conduction, convection and radiation. For relatively high RF power outputs, a preferred arrangement may be incorporated wherein direct physical contact is maintained between the power amplifier tube and the transmitter heat radiating member to effectively increase the heat transfer therefrom.

Two separate lateral heat radiating members are positioned at the opposing sides of the chassis and provide efficient heat dissipation for the power switching transistors of the power supply which are mounted in recessed cavities therein. The transistors may be insulated from the members so that they may be energized from an electrical system of unilateral potential with either positive or negative ground polarity. The lateral side heat radiating members further provide mechanical interconnection for the receiver, transmitter, and power supply sections to form an integral operating chassis unit. A housing is provided including a base mounting plate which may be secured in a vehicle, a cover plate and a front panel. The operating chassis unit and housing parts are held in assembled relation by interlocking portions thereon, and by cooperation between the housing parts and the lateral side heat radiating members.

Figure 1:
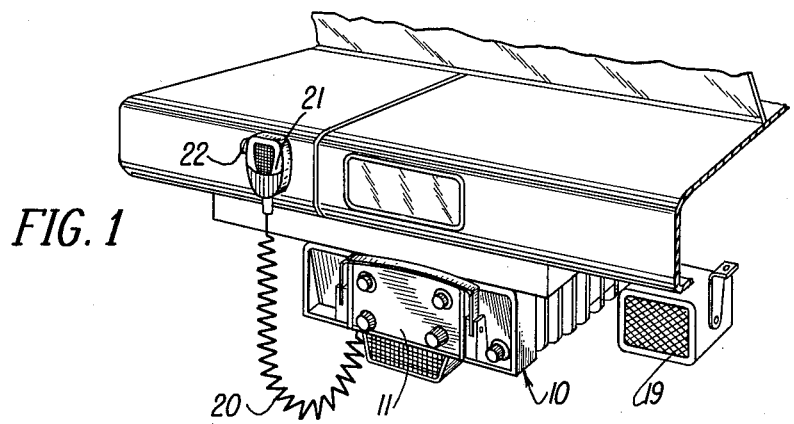
FIG. 1 illustrates the two-way communications equipment mounted under the dash of an automobile.

Referring now to the drawings, in FIG. 1 of the communications apparatus is illustrated mounted under the dash of an automobile. The radio unit proper 10 extends toward the fire wall of the vehicle and a control head 11 is secured to the front panel thereof. Connected to the control head 11 by cable 20 is a microphone 21 which includes a push-to-talk switch 22 for actuating the transmitter. A speaker 19 is connected to the control head for reproducing received signals.

Figure 2:
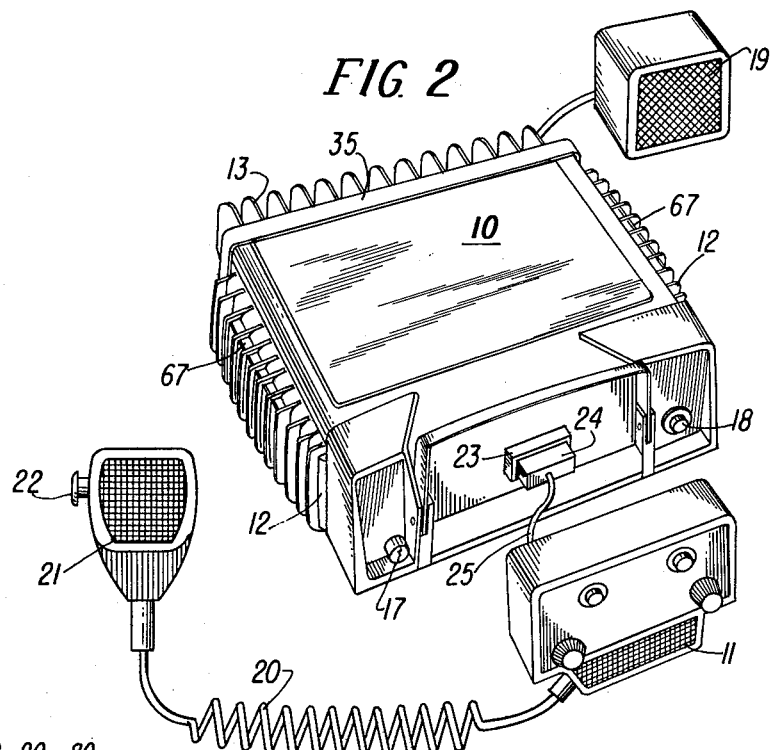
FIG. 2 illustrates the components of the equipment for mounting, with the control head separate from radio apparatus proper.

FIG. 2 illustrates a unit for remote mounting with the control head 11 separated from the main radio chassis proper 10 and connected thereto by cable 25. The radio chassis proper may be mounted in any desirable location, such as in the trunk of the vehicle and connected to the control head through the cable 25. The operating controls are included as an integral part of the control head 11. The microphone 21 and speaker 19 are connected to the control head as in FIG. 1.

FIG. 3 shows the arrangement of the component parts or sections of the communications apparatus, with the parts in exploded view. A front panel 31 is secured to the receiver 32 at the front of the radio apparatus. The transmitter 34 is at the rear, with the power supply 33 interposed between. At the rear of the transmitter is a heat radiating housing 13 for enclosing the power amplifying tubes of the transmitter. This provides effective heat control and dissipation so that the sections may be positioned in closely spaced relation. Lateral side heat radiating members 12 are affixed to the opposing sides of the chassis unit 10 to dissipate the heat generated by the power switching transistors of power supply 33. All heat radiating members are painted a dull black and include a plurality of projecting fins to optimize the efficiency of heat dissipation.

FIGS. 3 to 8 show the interconnections of the sections of the radio chassis proper in various views. Receiver section 32, power supply section 33, and transmitter section 34 are each mechanically connected to heat radiators 12 provided on opposing sides thereof. As seen in FIG. 3, receiver 32 includes laterally projecting ribs 40 with center-tapped holes 41 receiving screws 43 passing through holes 42 in side heat sink 12. Transmitter 34 includes a single laterally projecting rib 44 with tapped holes 45 receiving screws 46 passing through similar holes in side heat sink 12. The power supply 33 includes a centrally located tapped hole 47 to receive screw 49 passing through hole 48 in side heat sink 12. Heat sink 12 includes projecting rib 71 (FIG. 7) which contacts the side of power supply 33. With the side heat sinks thus mounted on oposing sides, section units 32, 33 and 34 are secured in assembled relation as a single operating chassis.

The heat radiator 13 for the transmitter 34 is secured thereto by screws 50, as best shown in FIGS. 5 and 8. Front panel 31 is secured to receiver section 32 by screws 51 which extend into bosses 52 (FIG. 5). Accordingly, the sections of the unit are mechanically secured and may be electrically connected into a single operating chassis unit.

As shown in FIGS. 3, 6 and 7, side heat radiators 12 further include a central recessed cavity 54 to provide a convenient mounting facility for power transistor switching devices 62 connected to the power supply 33. Transistors 62 are secured to mounting plate 63 by screws 65 with the electrodes of the transistors extending through holes 61 in the mounting plate 63 and through similar holes provided in heat sink 12 and power supply chassis 33. Mounting plate 63 is secured to heat sink 12 by screws 66. A thin wafer of mica material 64, shown in FIGS. 3 and 7, is inserted between mounting plate 63 and the base metal of heat sink 12 to effectively isolate the transistors and mounting plate from the heat sink 12 (ground potential) thereby permitting operation of the radio unit from the electrical system of the vehicle in which it is installed, regardless of the polarity. The mica wafer insures proper heat conduction therethrough to the heat sink 12 to maintain proper operating temperature. As shown in FIG. 7, screws 66 are insulated from mounting plate 63 by insulating bushings 72.

Rectangular holes 60 are provided through which the connecting wire leads from power supply 33 pass to the transistors 62. Recessed cavity 54 of heat sink 12 will accommodate two such mounting plates 63, each of which will accommodate two transistors 62. Thus up to four switching transistors may be included on each lateral heat sink 12, or a total of eight for the radio unit. Cover plate 67 encloses transistors 62 in cavity 54 and is secured thereto by screws 69 extending through holes 68 in the cover plate and mating with tapped holes in bosses 70 on heat sink 12.

To provide an enclosure and mounting facilities for the radio unit, a mounting base plate 35 is provided together with a top cover plate 30. When the chassis sections are interconnected, as previously described, they may be positioned upon the base plate 35 with upturned sides 35a, as shown in FIG. 3, supporting chassis sections 32, 33 and 34 at the aforementioned laterally projecting ribs; ribs 41 on receiver 32, rib 44 on transmitter 34 and by rib 71 (FIGS. 5 and 7) on heat sink 12. The chassis unit may be slid on base 35 with heat radiator 13 extending into the open bracket portion 35b. Mounting base plate 35 and bracket 35b include inturned edges 35c which are engaged by edges 13a on heat radiator 13 as the chassis unit is moved into position on the mounting base.

Top cover plate 30 extends over chassis sections 32, 33 and 34 between lateral side heat sinks 12 with edges 30a resting on top of the laterally projecting ribs 41, 44 and 71 (FIG. 5). The back edge of cover 30 extends under bracket 35b to hold the cover in place. When the chassis unit is moved all the way back in the frame, the edge portion 31a of front cover plate 31 extends over the front edge of top cover plate 30 and also the front edge of mounting plate 35. This holds the chassis, mounting and cover plate in assembled relation.

The chassis unit may be held in position on mounting plate 35 by a key operated latch 17 having a movable portion 17a which extends into slot 35d in mounting plate 35. To service the unit it is merely necessary to release latch 17 and slide the chassis unit forward. This makes it possible to remove top cover 30 providing access to the top of the chassis sections. The chassis unit may be slid forward and completely removed from mounting plate 35 to provide access to the bottom sides of the chassis sections. Access to the power transistor switching devices 62 may be had by removing cover plates 67 on the heat sinks 12. A pivoted handle 73 is provided on the front plate 31 to facilitate removal of the chassis unit and make it easier to carry the complete unit. To disconnect the radio chassis 10 in trunk-mount installations (FIG. 2), it is only necessary to remove the connector 24 on cable 25 which cooperates with the connector 23 on the front plate, and to remove the antenna cable from the connector 18. For dash-mount installations, it is merely necessary to detach the control head 11 from radio chassis 10 and disconnect the antenna cable from connector 18.

FIG. 8 shows the cooperation of the heat radiator 13 with the power amplifying tubes 53a and 53b mounted on the back of transmitter chassis section 34. Heat radiator 13 includes a recessed cavity 90 into which tubes 53a and 53b extend. The heat from the tubes is normally internally radiated within heat sink 13 and is removed therefrom by subsequent external dissipation. This construction has been found to be highly satisfactory for radio units of moderate power output.

Figure 9:
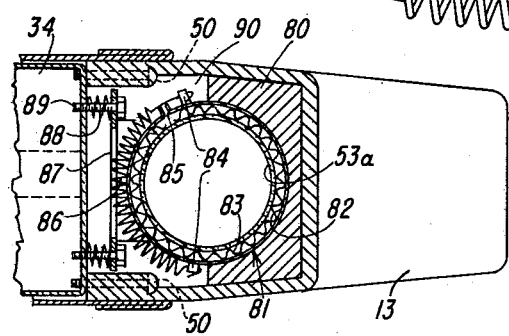
FIG. 9 is a cross sectional view of the transmitter heat radiating element for the power amplifier tube.

FIGS. 8 and 9 show another arrangement for dissipating heat generated in the transmitter power amplifier tube by heat radiating member 13, which may be preferred for radio units having relatively high RF power outputs. In this embodiment, a metallic heat conducting casing 81 is provided for substantially encasing power amplifier tube 53a. As shown in FIG. 9, heat conducting casing 81 consists of an outer shell 82 and a corrugated lining 83. Corrugated lining 83 is positioned between outer shell 82 and the tube envelope of power amplifier 53a, providing a resilient cushion to accommodate variations in the glass envelope of tube 53a thereby insuring intimate envelope contact. Casing 81 has a "closed-C" type construction with transverse edges forming an open seam 85 to facilitate its installation or removal. Seam 85 is held in the closed position by springs 86 cooperating with lugs 84 thereby maintaining casing 81 firmly affixed on the power amplifier tube 53a.

As shown in FIGS. 8 and 9, a formed block 80 of heat absorption material is included in recessed cavity 90 of heat radiating member 13 which engages directly and partially surrounds heat conducting casing 81 on power amplifier tube 53a. Improved heat dissipation is thereby accomplished by the direct conduction of heat from power amplifier 53a through the heat conducting casing 81 to formed block 80, and is effectively dissipated from the plurality of fins incorporated on heat radiating member 13. Block 80 may be formed or cast as an integral part of heat radiating member 13 or constructed as a separate component part and mechanically affixed within the recessed cavity 90 by bolts or other suitable securing means.

Since mechanical tolerances are commonly known to vary among different production units, a facility is provided to effectively compensate for such variations. This is accomplished by providing mounting base 87 for tube 53a with support springs 88. Screws 89 pass through springs 88 to affix mounting base 87 to transmitter chassis 34. Support springs 88 thus permit sufficient lateral movement in mounting base 87 whereby the power amplifier tube 53a will be positionally adjusted to conform to the particular mechanical configurations of formed block 80. Positive contact is thus insured between casing 81 and formed block 80 by the forward pressure exerted by springs 88.

Thus it can be seen that communications apparatus in accordance with the present invention is provided as a compact unit which may be easily installed in automobiles or like vehicles in a variety of mounting arrangements or installations. The chassis sections of the unit are arranged so that they are easily accessible for servicing. The parts are arranged such that generated heat is effectively dissipated by separate and external heat radiator elements to maintain all circuit components within proper operating temperature range. In addition, side heat radiator elements mechanically interconnect the chassis units to form a single operation chassis unit, as well as a housing for the power transistor switching devices for convenient access to the same for servicing purposes. Further, the power transistor switching devices are effectively isolated from ground such that the radio unit may be energized from an electrical system having either positive or negative ground polarity. This is accomplished by the inclusion of an insulating mica washer which allows effective heat conduction to the heat radiating elements.

I claim:
1. Electronic apparatus including in combination, a plurality of separate chassis sections adapted to be electrically and mechanically interconnected, means for electrically interconnecting said chassis sections as a single operating chassis unit, first and second heat sinks, said first and second heat sinks being affixed to opposing sides of said chassis unit, means connecting said first and second heat sinks to said chassis sections to mechanically secure said chassis sections in assembled relation, at least one of said sections having components which produce substantial heat which are mounted on said first and second heat sinks, and housing means including a front panel, and top and bottom portions which enclose said chassis sections, said front panel being affixed to the front of said chassis unit and having inturned edges which surround portions of said top and bottom portions of said housing means to hold said electronic apparatus in assembled relation.

2. Electronic apparatus including in combination, a plurality of separate chassis sections adapted to be electrically and mechanically interconnected, first, second and third heat sinks, said first and second heat sinks being affixed to opposing sides of said chassis sections to mechanically secure the same in assembled relation as a unit, at least one of said sections having components which produce substantial heat which are mounted on said first and second heat sinks, cover means for said first and second heat sinks for enclosing said heat producing components thereon, said third heat sink being affixed to the rear of the chassis unit, and housing means including a front panel and top and bottom portions, said bottom portion having an open frame at the rear end thereof, said chassis unit being positioned on said bottom portion with said third heat sink extending through said open frame, said top housing portion being positioned on said chassis unit and engaging said open frame at the rear thereof, said front panel being affixed to the front of said chassis unit and having inturned edges which surround portions of said top and bottom portions of said housing means, said front panel further including latch means to cooperate with said housing means whereby said chassis unit and said housing means are held in assembled relation.

3. Electronic apparatus including in combination, a plurality of separate chassis sections adapted to be electrically and mechanically interconnected, first, second and third heat sinks, said first and second heat sinks being affixed to opposing sides of said chassis sections to mechanically secure the same in assembled relation as a unit, said first and second heat sinks and said chassis sections being shaped to provide grooves therebetween on each side of each heat sink, said third heat sink being affixed to the rear of the chassis unit, and housing means including a front panel and top and bottom portions, said bottom portion having an open frame in the rear end thereof, said chassis unit being positioned on said bottom portion with said third heat sink extending through said open frame, said bottom housing portion having up turned sides extending into the grooves between said first and second heat sinks and said chassis sections, said top housing portion being positioned on said chassis unit and engaging said open frame at the rear thereof, said top housing portion having down turned sides extending into the grooves between said first and second heat sinks and said chassis sections, said front panel being affixed to the front of said chassis unit and having inturned edges which surround portions of said top and bottom portions of said housing means, said front panel further including latch means to cooperate with said housing means whereby said chassis unit and said housing means are held in assembled relation.

4. Communications apparatus for use in a vehicle to provide two-way radio communications including in combination, a plurality of chassis sections adapted to be electrically and mechanically interconnected including transmitter, receiver and power supply chassis sections, means for interconnecting said chassis sections as a single operating chassis unit, first, second and third heat sink means externally located to dissipate heat, a front panel including latch means connected to the forward end of said receiver chassis section, housing means for completely enclosing said chassis unit including a bottom plate having an open frame portion at the rearward end and a top cover plate, said transmitter chassis section having high power components with said first heat sink affixed to the rearward side of said transmitter chassis section and extending through said open frame in said housing means, said second and third heat sink means being laterally affixed to opposing sides of said chassis unit and mechanically securing said transmitter, receiver and power supply chassis sections in assembled relation, and a plurality of power transistors electrically connected to said power supply chassis section and mounted on said second and third heat sinks to conduct heat thereto, said front panel having inturned edges surrounding portions of said bottom plate and said top plate, with said latch means cooperating with said bottom plate of said housing means whereby said communications apparatus is held in assembled relation.

5. Communications apparatus for use in a vehicle to provide two-way communications including in combination, transmitter, receiver and power supply chassis sections adapted to be electrically and mechanically interconnected, means for electrically interconnecting said chassis sections as a single operating chassis unit, said receiver section having portions laterally projecting along opposite sides thereof, said transmitter chassis sections having portions laterally projecting along opposing sides thereof, a front panel including latch means affixed to the forward side of said receiver chassis section and housing means for completely enclosing said chassis unit including a top plate and a bottom cover plate having an open frame portion at the rearward end, said transmitter chassis section having a first heat sink affixed to its rearward side and extending through said open frame in said housing means, second and third heat sinks laterally affixed to opposing sides of said chassis sections and having means cooperating with said projecting portions to mechanically secure said transmitter and receiver sections thereto, said second and third heat sinks having projecting portions secured to said power supply section, whereby said chassis sections are held in assembled relation, said laterally projecting portions providing a space between said chassis sides and said second and third heat sinks, said bottom plate of said housing means having upturned edges extending upward between said sides of said chassis unit and said heat sinks, said top plate having downturned edges extending downward between said chassis unit and said laterally positioned heat sinks, said front panel having inturned edges surrounding a portion of said top and bottom plates with said latch means cooperating with said bottom plate to hold the communications apparatus in assembled relation thereby.

6. Communications apparatus for installation in a vehicle having an electrical system to provide a two-way communications including in combination, a radio operating unit including receiver, power supply and transmitter units chassis sections, said receiver being completely transistorized for operation directly from the electrical system of the vehicle, said transmitter including high power amplifying elements, said power supply providing the operating voltages for said transmitter and having power transistor switching devices, first, second and third heat sinks, and housing means for enclosing said radio unit and having an open frame at its rearward end, said first heat sink being affixed to said rearward end of said transmitter chassis unit and having a recessed cavity to house said high power amplifying elements, said first heat sink extending through said open frame of said housing means, said second and third heat sinks being affixed to opposing sides of the radio unit and having means for mechanically securing said chassis sections in assembled relation, said second and third heat sinks each having a recessed cavity for containing said power transistor switching devices of said power supply mounted therein, cover means secured to said second and third heat sinks for enclosing said transistor switching devices thereon, and insulating means for isolating said power transistors from ground potential whereby the radio unit is operable from an electrical system of either electrical polarity.

7. Communications apparatus including in combination; a plurality of chassis sections including receiver, power supply and transmitter units adapted to be electrically and mechanically interconnected forming a single operating unit, means for dissipating heat therefrom including first, second and third heat sinks, said first and second heat sinks being affixed to opposing sides of the radio unit and having means for mechanically securing said chassis section in assembled relation, and housing means for enclosing said radio unit and having an open frame at its rearward end, said transmitter having high power amplifying means including an electron discharge device, said third heat sink being affixed to said rearward end of said transmitter chassis unit and extending through said open frame of said housing, said electron discharge device having a heat conducting casing shaped to substantially surround said electron discharge device and including a resilient corrugated lining positioned between said electron discharge device and the outer shell of said heat conducting casing for shock absorption, said third heat sink having a recessed cavity to house said high power amplifying means and including a formed block of heat absorption material therein shaped in conformance with the physical configuration of said electron discharge device, said electron discharge device having resilient support means for holding said heat conducting casing in direct heat conduction engagement with said formed block in said recessed cavity.

8. Communications apparatus including in combination; a radio unit including receiver, power supply and transmitter chassis sections adapted to be electrically and mechanically interconnected, means for mechanically interconnecting said chassis sections in assembled relation as a single operating unit, housing means for enclosing said radio unit and having an open frame at its rearward end, said transmitter chassis section having high power amplifying means including an electron discharge device, said electron discharge device having a heat conducting casing substantially encasing the same, a heat radiating element affixed to said rearward end of said transmitter chassis section and extending through said open frame of said housing, said heat radiating element having a recessed cavity for enclosing said high power amplifying means and having therein a formed block of heat absorption material shaped in conformance with the physical configurations of said electron discharge device, and resilient support means for holding said heat conducting casing on said electron discharge device in direct heat conduction engagement with said formed block in said recessed cavity.

References Cited in the file of this patent
UNITED STATES PATENTS

| | | |
|---|---|---|
| 2,984,774 | Race | May 16, 1961 |
| 3,017,507 | Birkens | Jan. 16, 1962 |